Patented May 19, 1936

2,041,550

UNITED STATES PATENT OFFICE 2,041,550

VAT DYESTUFFS OF THE ANTHRAQUINONE SERIES

Hans Krzikalla and Walter Limbacher, Ludwigshafen-on-the-Rhine, Germany, assignors to General Aniline Works, Inc., New York, N. Y., a corporation of Delaware No Drawing. Application June 27, 1935, Serial No. 28,768. In Germany July 6, 1934

3 Claims. (Cl. 260—60)

The present invention relates to vat dyestuffs of the anthraquinone series.

We have found that valuable vat dyestuffs of the anthraquinone series are obtained by condensing alpha-aminoanthraquinone with 2-hydroxy-3-methylbenzene-1-carboxylic acid or 3-methyl-6-hydroxybenzene-1-carboxylic acid. In order to prepare the dyestuffs, alpha-aminoanthraquinone may either be treated with the chloride of the methylhydroxybenzene carboxylic acid, preferably in the presence of a diluent, or a mixture of alpha-aminoanthraquinone and the methylhydroxybenzene carboxylic acid may be treated in a suitable diluent with an agent for withdrawing water, as for example thionyl chloride or phosphorus oxychloride. Suitable diluents are for example nitrobenzene or ortho-dichlorbenzene.

The dyestuffs are very readily vatted and dye wool clear, uniform yellow shades which are distinguished by excellent fastness to light, steaming and washing.

The following example will further illustrate how the said invention may be carried out in practice but the invention is not restricted to this example. The parts are by weight.

Example 223 parts of alpha-aminoanthraquinone and 170 parts of 2-hydroxy-3-methylbenzene-1-carboxylic acid are introduced into 4000 parts of commercial ortho-dichlorbenzene. 140 parts of thionyl chloride are then allowed to drop in during the course of about two hours at from 60° to 70° C. The whole is then slowly heated to boiling and then allowed to cool after about 2 hours, the dyestuff thus being crystallized in the form of yellow needles. It is filtered off, washed and dried. It dissolves in concentrated sulfuric acid giving an orange coloration. When the solution is poured into water the dyestuff is precipitated in the form of a pale yellow flocculent deposit. It dyes wool from a mild alkaline vat very clear greenish yellow shades of excellent fastness to steaming, washing and light.

The dyestuff prepared in a similar manner when employing 3-methyl-6-hydroxybenzene-1-carboxylic acid yields similar dyeings having equally good fastness properties.

What we claim is:
1. Vat dyestuffs of the anthraquinone series corresponding to the general formula:

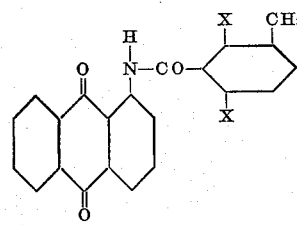

in which one X stands for the hydroxyl group the other X being hydrogen.

2. The vat dyestuff having the formula:

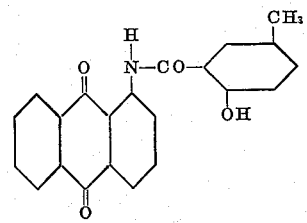

3. The vat dyestuff having the formula:

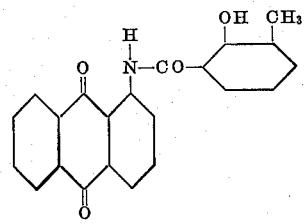

HANS KRZIKALLA.
WALTER LIMBACHER.